United States Patent [19]
Dessapt et al.

[11] Patent Number: 6,036,848
[45] Date of Patent: Mar. 14, 2000

[54] METHOD FOR LOADING AND UNLOADING A CATALYST WITHOUT HALTING THE PROGRESS OF AN OPERATION

[75] Inventors: Jean-Paul Dessapt, Beynes; Pierre Marache, Rueil Malmaison; Alain Forestiere, Vernaison, all of France

[73] Assignee: Insitut Francais du Petrole, Rueil-Malmaison Cedex, France

[21] Appl. No.: 09/022,012

[22] Filed: Feb. 11, 1998

[30] Foreign Application Priority Data

Feb. 12, 1997 [FR] France .................................... 97 01791

[51] Int. Cl.$^7$ ...................................................... B01J 8/04
[52] U.S. Cl. ...................... 208/152; 203/29; 203/DIG. 6; 422/191; 422/219; 585/922; 585/923
[58] Field of Search ............................... 208/152; 203/29, 203/DIG. 6; 422/219, 191; 585/922, 923

[56] References Cited

U.S. PATENT DOCUMENTS

| | | | |
|---|---|---|---|
| 4,502,946 | 3/1985 | Pronk | 208/152 |
| 4,975,036 | 12/1990 | Jagannathan | 422/216 |
| 5,133,942 | 7/1992 | Jones | 422/142 |
| 5,198,196 | 3/1993 | Jones, Jr. et al. | 422/219 |
| 5,338,517 | 8/1994 | Evans, III et al. | 422/191 |
| 5,449,501 | 9/1995 | Luebke et al. | 422/191 |
| 5,510,089 | 4/1996 | Jones | 422/189 |
| 5,523,061 | 6/1996 | Hao et al. | 422/191 |

FOREIGN PATENT DOCUMENTS

| | | |
|---|---|---|
| 0 571 163 | 11/1993 | European Pat. Off. . |
| 1 667 139 | 6/1971 | Germany . |

*Primary Examiner*—Walter D. Griffin
*Attorney, Agent, or Firm*—Millen, White, Zelano & Branigan, P.C.

[57] ABSTRACT

The catalyst inside a catalytic reaction column is replaced while running the catalytic reaction by diverting a basically monophase fluid to keep it from passing through the catalyst, evacuating from the column the catalyst that has lost at least a portion of its properties, introducing into the column a quantity of catalyst that is approximately equal to the quantity of catalyst that was evacuated from the column, and restoring the circulation of the basically monophase fluid through the catalyst.

8 Claims, 2 Drawing Sheets

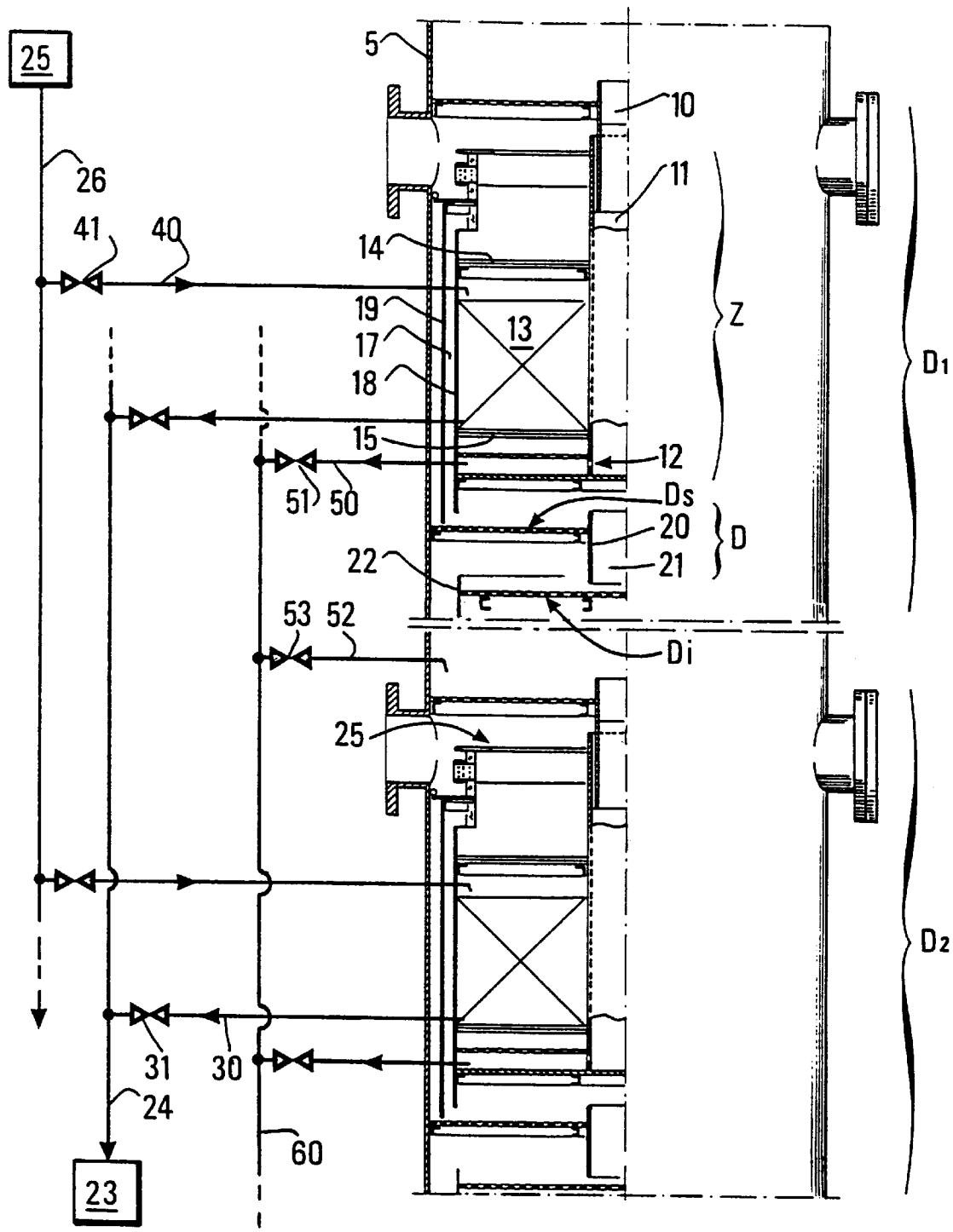

METHOD FOR LOADING AND UNLOADING A CATALYST WITHOUT HALTING THE PROGRESS OF AN OPERATION

FIELD OF THE INVENTION

This invention relates to a method and apparatus for replacing a product that initially has a given property and that has lost at least a portion of said property, for example, during a process that employs a chemical reaction, with the replacement being carried out without having to halt the progress of the process.

It pertains in particular to replacing a catalyst inside a catalytic distillation column when the catalyst, after chemical reaction, has lost at least a large portion of its properties that make it possible for the catalytic reaction to proceed.

BACKGROUND OF THE INVENTION

The use of a catalyst, particularly in catalytic distillation columns, to carry out conjointly the chemical reaction and the separation of the products that are obtained is well known in the prior art. The catalyst can come in different forms and be placed inside the column in the form of bundles, in envelopes, or loaded or distributed on plates of a conventional type. A column can include, for example, a series of stages in which the chemical reaction and the separation of products are carried out.

Over time, the catalyst or else the product that takes part in a reaction loses the characteristic properties that are necessary and sufficient and that make it possible for the operation to be carried out, within a length of time that depends particularly on the frequency of its use and chemical or other reactions that are employed. Thus, it proves necessary to repeat it and/or to regenerate it to restore to it its initial properties so as to maintain the efficiency of the operations that are carried out inside the columns.

The prior art describes different ways to proceed.

The simplest way consists in halting the process and regenerating in situ the catalyst that is present inside the column and/or in replacing it. This method has, however, the drawback of having to halt the process and thus the operation of the column and, because of the amount of time involved in regeneration and replacement operations, leading to high costs.

Another way consists in unloading and in reloading the catalyst without halting the progress of the process, for example by following one of the methods that is described in patents U.S. Pat. No. 5,198,196, U.S. Pat. No. 5,510,089 or else U.S. Pat. No. 5,133,942.

These documents teach in particular a method that makes it possible to unload and load a catalyst in a distillation column during operation. For this purpose, the method, as it is described in one of the three patents, consists in drawing off from the distillation column all of the fluid that consists of at least the liquid phase passing through the catalyst and solid particles of the catalyst and sending the whole mixture to a separation device, at the end of which the liquid phase that is purified of the solid particles is sent to the distillation column and recycled until the entire catalyst is evacuated from the plate; the solid particles of the catalyst are then sent to a means that makes it possible to regenerate them, for example. The loading of the catalyst is done by using a liquid to form, with the solid particles of the catalyst, a "slurry," and said "slurry" is sent to the plates at which the catalyst was unloaded.

This method is well suited for replacing catalysts through which a fluid passes that consists of the liquid phase and the vapor phase or gas phase. It requires, however, means for separating the catalyst and the liquid phase, which can be bulky and which help increase the cost of the device.

SUMMARY OF THE INVENTION

This invention proposes a simpler, less costly method that can be applied particularly to unloading and reloading a catalyst in a distillation column, for example, comprising separate paths for the circulation of the liquid phase and the vapor phase, whereby only or mostly a basically liquid phase or more broadly, a basically monophase phase passes through the catalyst.

It is particularly well suited for replacing a product that takes part in an operation whereby, for example, only a basically liquid phase or a basically vapor phase passes through the product.

The invention also relates to a method that makes it possible to replace a catalyst inside a catalytic reaction column while running the catalytic reaction into which is introduced a fluid that contains reagents at least in a catalytic reaction zone that comprises a catalyst that is placed on a plate, with said fluid being in a basically monophase form so that it passes through the catalyst and the products that are obtained are separated from the remainder of the fluid. It is characterized in that (a) the basically monophase fluid is diverted to keep it from passing through the catalyst, (b) the catalyst that has lost at least a portion of its properties is evacuated from the column, (c) a quantity of catalyst that is approximately equal to the quantity of catalyst unloaded is introduced, and (c) the basically monophase fluid again circulates through the catalyst.

According to one implementation of the method, with the column being at a given pressure, the unloading chamber is set at a pressure that is approximately identical to that of the column.

The basically monophase fluid can be diverted or deflected at one or more locations on the catalytic column.

According to one implementation of the method, it is possible to use at least one auxiliary reaction zone into which the basically monophase fluid that comes from at least one reaction zone is diverted; the catalyst that is placed in the reaction zone or zones is then unloaded, and these reaction zones are reloaded with a quantity that is approximately identical to the quantity of catalyst unloaded. The auxiliary reaction zone can be located outside the column or else is part of the column, whereby the latter can include a zone that is intended to play the role of the zone in which the replacement of the catalyst is carried out so as to retain the same number of active zones during operation.

It is possible to unload the used catalyst and to look for the catalyst plates using gravity.

According to an implementation of the process, for example, an auxiliary means is used to assist in unloading the catalyst to empty most of the catalytic plate. This can be particularly useful when the action of gravity is inadequate, particularly owing to the nature of the products or the catalyst and/or when it is necessary to empty the entire catalytic bed.

The invention also relates to a method that makes it possible to replace a product that has lost a portion of its properties, such as a catalyst, whereby said product takes part in a process that employs a chemical operation, with mostly a basically monophase phase passing through said product during operation.

It is characterized in that (a) at least for the most part the basically monophase phase is diverted to keep it from passing through said product, (b) said product that has lost at least a portion of its initial properties is evacuated, (c) a new quantity of product is introduced to replace the quantity of product that is extracted during stage (b), and (d) the circulation of the basically monophase phase through the product is restored.

The invention also relates to a system or a device that makes it possible to replace a reaction product inside a chamber within which a reaction is carried out, with the replacement being done without having to halt the operation.

It is characterized in that it includes means that make it possible to divert the basically monophase fluid that passes through the reaction product, means that make it possible to unload the used reagent product, and means that make it possible to introduce a new product inside the chamber in a quantity that is approximately identical to the quantity of product that is evacuated.

According to one embodiment, the chamber is a catalytic distillation column and the product is a catalyst.

Compared to the prior art, the method of loading and unloading of the catalyst offers in particular the following advantages:

it makes it possible to replace the catalyst and to load it without halting the process, it offers a simpler and less costly device, with the paths of the basically liquid and basically vapor phases being separate inside the catalyst.

BRIEF DESCRIPTION OF THE DRAWINGS

Other advantages and characteristics of this invention will become clearer from reading the description provided below as sample embodiments, within the scope of applications which are by no means limiting, by referring to the accompanying drawings where:

FIG. 2 shows a view in section of a detail of the device according to the invention that is equipped with means that make it possible to replace the catalyst.

DETAILED DESCRIPTION

Figure 1:
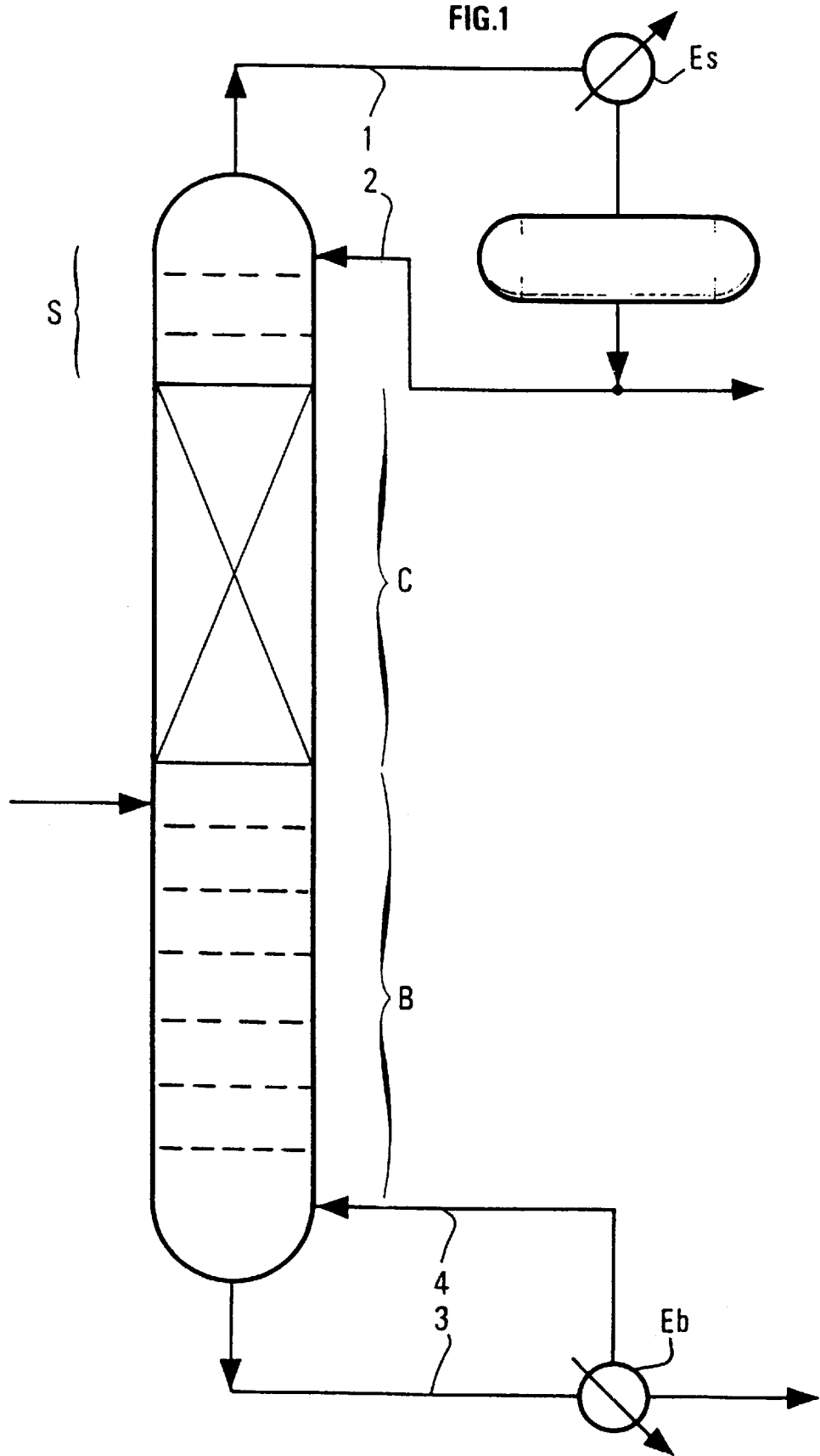
FIG. 1 shows a diagram of a catalytic distillation column.

To make it easier to understand the method for replacing a product that is used during the operation of a device, according to the invention, the examples that are provided below in connection with the figures relate to an operation for replacing a catalyst in a catalytic distillation column without halting the operation of this column.

FIG. 1 very roughly reproduces the structure of a catalytic distillation column that is similar to, for example, that described in Patent FR 2,737,132 of the applicant. However, without exceeding the scope of the invention, it is possible to use the method as described in this application in any column that makes it possible to ensure a chemical reaction and the separation simultaneously, particularly by distillation, of products obtained where only a basically liquid phase, vapor phase, or gas phase passes through the catalyst, with the phase being diverted from the catalyst.

The catalytic column that is depicted in FIG. 1 includes, for example, three zones, a catalytic zone C in which the chemical reaction and the separation into separate zones are carried out; in this embodiment, the separation is a distillation operation, a top or rectification zone S, and a base or drain zone B.

Top S is equipped with, for example, a pipe 1 or line for evacuating vapors of the most volatile components and a pipe 2 that makes it possible to introduce a liquid fraction that is formed by, for example, at least a fraction of the vapors that are condensed in exchanger Es.

At base B are a line 3 or pipe that makes it possible to evacuate the least volatile components in liquid form and a line 4 that makes it possible to introduce a vapor fraction that is produced by, for example, partial vaporization of at least a portion of the components in exchanger Eb. It is also equipped with one or more pipes for the possible introduction of all or part of the reagents.

Internally, catalytic zone C receives a liquid phase that is produced by the reflux that is introduced in the reactive distillation zone and a vapor phase that is produced by the reboiling vapor that is introduced, for example, at the distillation base.

Externally, it is also possible to introduce for example, at at least one level, a possible addition of at least one of the reagents that is pure or diluted with, for example, alcohol, in the case where the device is used in the synthesis of ethers; this variant embodiment is not shown in the figure.

FIG. 2 shows a view in section of a portion of the column according to the invention that is equipped particularly with means that make it possible to replace the catalyst without halting the catalytic distillation operation.

The portion of the column that is depicted in this figure includes, for example, two pairs $D_1$, $D_2$ that are arranged one above the other. The word pair refers to a unit that includes at least one reaction zone Z that contains the catalyst and the distillation zone that makes it possible to separate the products that are obtained.

The column has, for example, a cylindrical wall 5 that forms a chamber in which the pairs are placed.

Each of pairs $D_1$ and $D_2$ includes, for example, a reaction zone Z that contains in particular the catalyst and at least one distillation zone D that makes it possible to carry out the separation.

Distillation zone D is placed, for example, between a lower distillation plate Di and an upper distillation plate Ds.

The fluid that contains the reagents and is in basically monophase form, for example, in basically liquid form, is introduced into the reaction zone by a central outlet 10 that is connected to a downtake 11. The downtake is located, for example, approximately in the center of the column or pair and comes out in a distribution device 12 from which the fluid that contains the reagents is sent to be distributed inside the catalytic bed or catalyst 13 so as to pass through the catalytic bed from bottom to top.

The catalyst can be in the form of a catalytic bed that is held in place by, for example, suitable means 14, 15 so that the bed does not overflow during the operation of the column, such as Johnson-type grids that extend over most of the surface of the catalytic bed. An empty space is preferably left between grid 15 and the upper portion of the catalytic bed. During its passage in the catalytic bed, the catalysis reaction is carried out, and at the output of the catalytic bed a basically liquid fluid is obtained that contains in particular the products that are obtained during the catalytic reaction and also the other products that have not reacted, whereby the latter may be in excess.

The basically liquid fraction pours out toward distillation zone D that is located below reaction zone Z through, for example, a space or passage 17 that is formed by a portion of the wall of chamber 18 of the reaction zone and an external wall 19 that is arranged, relative to the wall of chamber 18, so as to form one or more flow zones 17.

In the distillation zone, the basically liquid fluid reaches upper distillation plate Ds that includes, for example, an overflow edge 20 and a downtake 21 that is approximately central and allows the basically liquid fluid that is to be separated to pass from the upper distillation plate to the lower distillation plate. The plate can be equipped with baffles whose function is to reduce any turbulence that may be present in the basically liquid fraction that comes out of passage 17.

Found at the output of the distillation zone are a liquid fraction that contains the products that are obtained during the catalytic reaction and a vapor fraction.

Via a channel that is formed by, for example, edge 22 of the outlet of the lower plate and the wall of the column, the liquid fraction is then sent toward, for example, another pair $D_2$ that is located, for example, below, while the vapor fraction is evacuated toward the top of the column without passing through the catalytic bed, via another channel that is formed at least in part by the wall of the column and the outside wall of the reaction zone.

The gas fraction travels upward inside of the column, passing through circulation channels 25 that are separate from channels 17 of the basically liquid fraction before being evacuated at the top of the column.

To perform the replacement of the catalyst without halting the operation of the column and thus to maintain maximum efficiency in the process, the column is equipped with, for example, means which will make it possible in particular:

- to divert the basically liquid or monophase phase and to keep it from passing through the catalyst in particular to obtain a catalyst that is freed, at least for the most part, of the basically liquid or monophase phase,
- to unload the catalyst that has lost its necessary initial properties so that the reaction can be implemented,
- to load a new catalyst in an adequate quantity to obtain a level of efficiency that is approximately identical to the initial efficiency.

One approach consists in equipping the column with suitable means and connecting it to a system that includes the elements that are necessary for unloading the catalyst, for example, a network that includes one or more means for the chamber and particularly the reaction zone to communicate with the outside, such as pipes that can be connected to a main pipe 24 that is connected respectively to an unloading chamber 23 and, likewise, a circuit for distributing a catalyst that comes from an outside chamber to the space from which the catalyst was evacuated, comprising, for example, a main pipe 26 that is connected to a chamber 25 that contains a catalyst.

For the sake of clarity in the description, the pipes that are attached to the column and make it possible to unload the catalyst are referenced 30 and the valves on them are referenced 31, while the pipes that make the loading possible and the valves that are on these pipes are referenced 40 and 41.

The column is provided with means that make it possible to divert the circulation of the fluid from the catalytic beds. These means include, for example, one or more pipes 50 that are placed, at a pair $D_1$, preferably downstream from distribution means 12 (when the direction of circulation of the fluid through the catalyst is considered) to prevent or impede the passage of the basically liquid phase in the catalytic bed. A valve 51 that is on this pipe is in the open state when an attempt is made to divert the circulation of the fluid of the catalytic bed and is in the closed state during the normal operation of the catalytic column. Pipe 50 is connected to, for example, a main pipe 60 which is connected to all the pipes that are identical to pipe 50, i.e., to the pipes that make it possible to keep the fluid from circulating through the catalyst.

The fluid that is diverted from the catalytic bed at pair $D_1$ is then sent into, for example, pair $D_2$ that is located just below, via a pipe such as 52 that is equipped with a valve 53 and that comes out at the similar column of the central downtake of the second pair, so that the basically liquid phase that is diverted from the catalyst of pair D1 reaches the upper distillation plate to pour out via the central downtake of this pair.

At this moment, the catalyst virtually no longer contains any monophase fluid that has been diverted.

It is then possible to open valve 31 in such a way as to allow the passage of the used catalyst in pipe 30 up to unloading chamber 23 or else toward another location.

After most of the catalyst is unloaded, open valve 31 is closed, and the command is given to open valve 41 which is on pipe 40 that is located at pair $D_1$ and which will make it possible to carry out the loading of the reaction zone of pair $D_1$ and to replace essentially all of the used catalyst with a catalyst that is contained in loading chamber 24.

Once the quantity of new catalyst is reloaded at the catalytic bed, valve 51 is closed to restore the circulation of fluid inside the new catalyst and to allow the reaction actually to be carried out.

Different pipes 30, 40, 50 . . . pass through, for example, the wall of the column and the wall of the chamber that contains the catalyst, with the locations where the pipes pass being preferably equipped with means that make it possible to preserve the tightness of the whole.

The means of unloading the used catalyst and the means of loading the replacement catalyst that are mentioned above and that make it possible to carry out these operations under the action of gravity are linked to, for example, devices that supplement the phenomenon of gravity.

Advantageously, the chambers are brought to a pressure that is approximately identical to the pressure that prevails inside the column.

It is also possible to equip the above-described means of devices such as locks which will make it possible particularly to ensure the transition when the column and the chamber are at different pressures.

In the case of catalysts that are of a form or a consistency that is inadequate to make the replacement using only the action of gravity, it is possible to provide auxiliary means that make it possible to supplement the effect of gravity.

Of course, without exceeding the scope of the invention, the method of replacement can, without halting the production of the column, be implemented regardless of the direction of circulation of the fluids and particularly the direction of circulation of the liquid phase inside the catalytic bed.

In this case, for example, the device that makes it possible to divide and distribute the basically liquid phase is located above the catalytic bed, and the diversion line that makes it possible to divert the basically liquid phase from the catalytic bed is downstream from this distribution arrangement.

The replacement of the catalyst during the operation of a column can be done on one or more catalytic beds at the same time, and in one or more reaction zones.

It is also possible to provide, in some device variants, one or more auxiliary pairs thorough which the liquid phase that is diverted from the bed to be replaced is circulated, whereby these pairs may or may not be integrated inside the column.

The method that is described in relation to FIGS. 1 and 2 can be used without exceeding the scope of the invention for any type of device that includes at least one reaction zone inside of which is a product that takes part in a reaction and which loses its properties over time.

The preceding examples can be repeated with similar success by substituting the generically or specifically described reactants and/or operating conditions of this invention for those used in the preceding examples.

The entire disclosure of all applications, patents and publications, cited above and below, and of corresponding French application 97/01.791, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A method for replacing an at least partially deactivated catalyst from inside a catalytic reaction zone of a catalytic reaction column, wherein a fluid containing reagent is introduced into said catalytic reaction zone, said reaction zone comprising a catalyst disposed on a plate within the column, said process comprising:

passing the fluid containing the reagents through a downcomer and through a distributing device situated below the catalyst, diverting a liquid phase of the fluid by using a diverter communicating with the distributing device so as to avoid passage of the liquid phase through the catalyst, introducing the diverted liquid phase in another reactive zone below the reactive zone from which the liquid phase has been diverted, removing the at least partially deactivated catalyst from the column, replacing the removed at least partially deactivated catalyst with an approximately equal amount of active catalyst, to form a reconstituted catalyst, and resuming circulation of the liquid phase through the fresh catalyst.

2. Method according to claim 1, wherein the column has a given pressure and wherein the reactive zone is set at a pressure that is approximately identical to that of the column.

3. Method according to claim 1, wherein the at least partially deactivated catalyst is unloaded and the fresh catalyst is reloaded using gravity.

4. Method according to claim 1, wherein an auxiliary means is used to assist in unloading the catalyst so as to empty most of the catalytic plate.

5. A catalytic distillation column where a fluid containing reagent is introduced, said column comprising:

at least two catalytic zones, each catalytic zone comprising supports for maintaining the catalyst, a downcomer associated with a distributing device situated below the catalyst, partitions delimiting several spaces for the passage of a liquid phase, said spaces communicating with the distributing device, a diverter for diverting said liquid phase from the column upstream of the catalyst, said diverter communicating with the distributing device, a connection for introducing said diverting liquid phase in another reactive zone situated below the reactive zone from which the liquid phase has been diverted, an evacuator for evacuating the catalyst, said evacuator being located at a lower end of the catalytic zone, and a loader for loading fresh catalyst.

6. The column of claim 5, wherein the diverter and connection are comprised of lines of pipe.

7. The column of claim 5, wherein the evacuator and loader are comprised of lines of pipe.

8. The column of claim 5, wherein the supports are comprised of grids.

* * * * *